US012390939B1

(12) United States Patent
Moore et al.

(10) Patent No.: US 12,390,939 B1
(45) Date of Patent: Aug. 19, 2025

(54) MOBILE PAINTING SYSTEM

(71) Applicants: Craig Moore, Apex, NC (US); Glenda Moore, Apex, NC (US)

(72) Inventors: Craig Moore, Apex, NC (US); Glenda Moore, Apex, NC (US)

(*) Notice: Subject to any disclaimer, the term of this patent is extended or adjusted under 35 U.S.C. 154(b) by 477 days.

(21) Appl. No.: 17/961,769

(22) Filed: Oct. 7, 2022

Related U.S. Application Data

(60) Provisional application No. 63/255,192, filed on Oct. 13, 2021.

(51) Int. Cl.
| B25J 11/00 | (2006.01) |
| B05C 17/02 | (2006.01) |
| B25J 13/00 | (2006.01) |
| B25J 13/08 | (2006.01) |
| B44D 3/12 | (2006.01) |

(52) U.S. Cl.
CPC ....... *B25J 11/0075* (2013.01); *B05C 17/0245* (2013.01); *B25J 13/006* (2013.01); *B25J 13/088* (2013.01); *B44D 3/126* (2013.01)

(58) Field of Classification Search
CPC .... B25J 11/0075; B25J 13/006; B25J 13/088; B05C 17/0245; B44D 3/126
See application file for complete search history.

(56) References Cited

U.S. PATENT DOCUMENTS

| 11,701,682 | B1* | 7/2023 | Logan | G06F 3/167 492/13 |
| 2004/0085222 | A1* | 5/2004 | Yoshikawa | G05D 1/0022 340/13.25 |
| 2006/0066064 | A1* | 3/2006 | Hardy | B62B 3/02 280/79.2 |
| 2008/0247808 | A1* | 10/2008 | Costigan | B05C 17/035 401/137 |
| 2009/0302563 | A1* | 12/2009 | Thibault | B62B 3/104 280/727 |
| 2018/0093289 | A1* | 4/2018 | Raman | G05D 1/0234 |
| 2018/0173223 | A1* | 6/2018 | Doane | G01C 21/20 |

* cited by examiner

*Primary Examiner* — Adam R Mott
*Assistant Examiner* — Ricardo I Viscarra
(74) *Attorney, Agent, or Firm* — K&L Gates LLP

(57) ABSTRACT

Mobile painting systems are generally described. In some examples, a mobile painting system may include a vehicle with a wireless receiver, a first motor configured to drive at least one wheel of the vehicle, a first power supply configured to supply power to the first motor, and a recessed portion sized and shaped so as to receive a paint tray. The mobile painting system may include a painting device including a wireless transmitter, a first selectable control, and a second power supply. The first selectable control may transmit control signals effective to control operation of the first motor when received by the wireless receiver of the vehicle.

18 Claims, 10 Drawing Sheets

MOBILE PAINTING SYSTEM

CROSS-REFERENCE TO RELATED APPLICATIONS

This application claims the benefit of U.S. Provisional Application No. 63/255,192, filed Oct. 13, 2021, the disclosure of which is incorporated herein by reference in its entirety.

FIELD

This application relates generally to a paint roller and tray.

BACKGROUND

One of the more ubiquitous tools used in painting is the paint roller and paint tray. During the typical use of these tools, the paint tray is loaded with paint and moved adjacent to the surface to be painted, the paint roller is dipped into the paint tray and the paint is rolled onto the surface being painted. This process is then repeated as the user moves around the room or surface to be painted. Typically, as the painter moves around the room or other area of surfaces to be painted, the loaded paint tray is picked up and moved around the room. Alternatively, the user is required to move back to the tray in successive trips to reload the roller with paint as the roller runs dry.

SUMMARY

Systems and methods are provided for mobile painting systems. In some examples, a mobile painting system may include a vehicle. The vehicle may include a wireless receiver and a first motor configured in communication with the wireless receiver. The first motor may be configured to drive at least one wheel of the vehicle. In various examples, the vehicle may further include a first power supply configured to supply power to the first motor. In various cases, the vehicle may include a body that includes a recessed portion sized and shaped to support a paint tray. In some examples, the mobile painting system may include a wireless transmitter, a first selectable control, and/or a second power supply. The first selectable control may be effective to generate a first control signal in response to selection of the first selectable control. The first control signal may be effective to control operation of the first motor when selected.

In some examples, vehicles for mobile painting systems are generally described. In various cases, the vehicles may comprise a wireless receiver and a first motor configured in communication with the wireless receiver, the first motor being configured to drive at least one wheel of the vehicle. In various examples, the vehicles may further include a first power supply configured to supply power to the first motor. In yet other examples, the vehicles may include a body comprising at least one feature effective to secure a paint tray to the vehicle. In some examples, the wireless receiver is effective to receive a first control signal from a controller device integrated in a painting device to control operation of the first motor.

In still other examples, methods for controlling mobile painting systems are generally described. In some examples, the methods may include receiving a first selection of a first selectable control of a painting device. In some cases, the methods may include generating, in response to selection of the first selectable control, a first control signal. In some cases, the methods may further include transmitting the first control signal using a wireless transmitter. In various cases, a wireless receiver of a vehicle may receive the first control signal. In some examples, the methods may include controlling operation of a first motor of the vehicle in response to the first control signal. In some cases, a body of the vehicle may include a recessed portion sized and shaped to support a paint tray and/or another feature or features effective to secure the paint tray to the vehicle.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various respects, all without departing from the scope of the present invention. Accordingly, the drawings and detailed description are to be regarded as illustrative in nature and not as restrictive.

DETAILED DESCRIPTION

Figure 1:
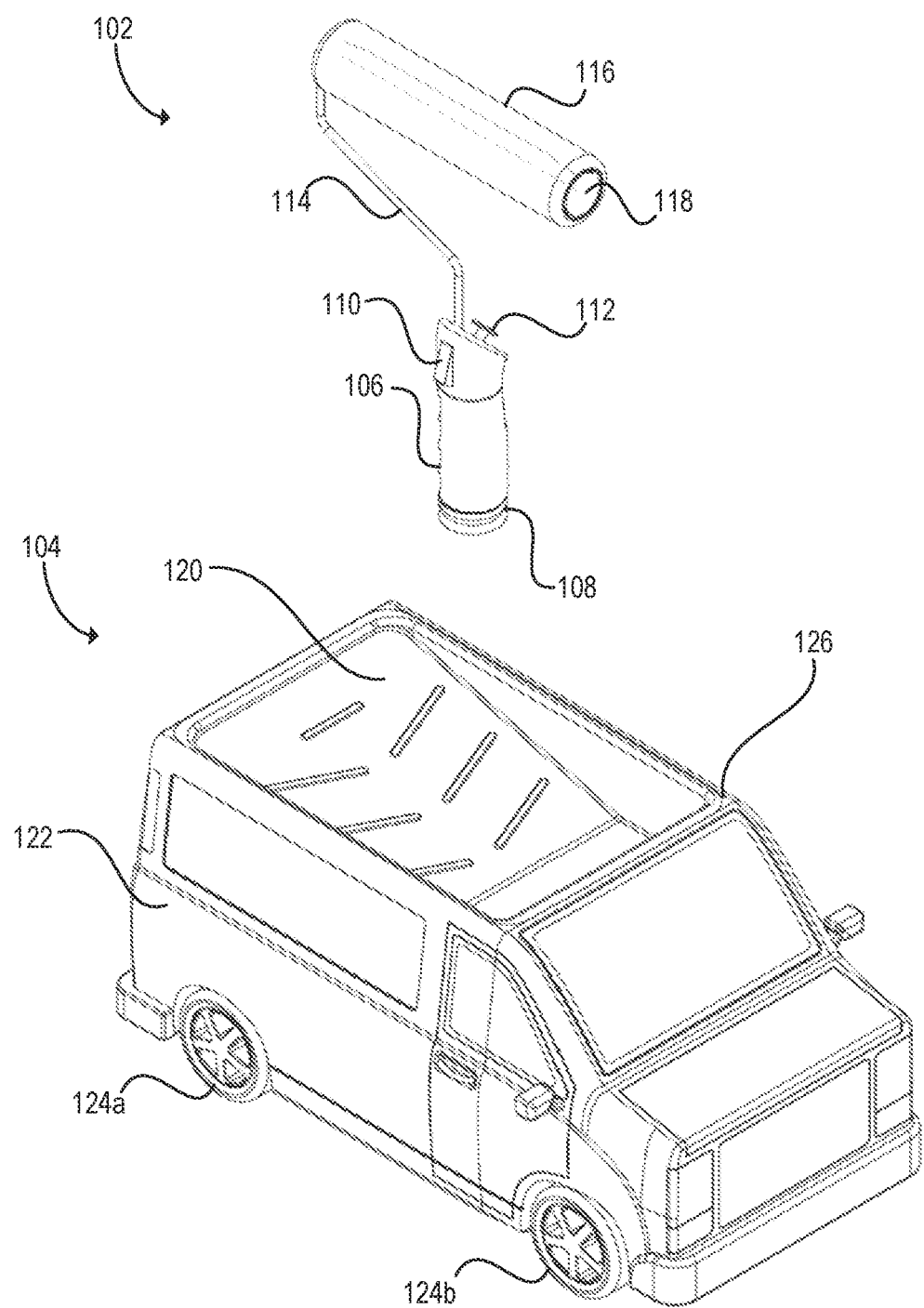
FIG. 1 depicts a paint roller and mobile paint tray vehicle, in accordance with various aspects of the present disclosure.

Described herein is a mobile painting system that removes the need to either move the paint tray around a room while painting or to walk back and forth to the paint tray to apply more paint to the roller. The mobile painting system comprises a mobile paint tray vehicle that may be remotely controlled using wireless communication technology to move the paint tray to the position that it is needed at any given time. This makes the painter's job easier as the painter does not need to make as many trips to and from a stationary paint tray and does not need to bend down to move the paint tray to a more convenient location.

In various examples described herein, the mobile paint tray vehicle may be remotely controlled using a special paint roller controller device that includes a paint roller as well as controls that may be used to send control signals to the mobile paint tray vehicle to move the mobile paint tray vehicle to any desired location. The paint roller controller device may include a handle housing that includes an integrated and powered wireless transmitter. The wireless transmitter may transmit control signals to the mobile paint tray vehicle from two (or more) selectable controls. The selectable controls may be integrated into the paint roller controller device. One of the selectable controls may control vehicle acceleration. For example, a trigger may be actuated in a first direction to control motors of the mobile paint tray vehicle to cause forward or reverse movement of the mobile paint tray vehicle, while actuation of the trigger in the opposite direction may control the motors to move in the opposite direction. In some implementations, only a single direction of vehicle movement may be supported. A second selectable control may be used to control steering of the mobile paint tray vehicle. For example, a joystick and/or other toggle may be provided and used to steer the mobile paint tray vehicle. For example, the joystick and/or other toggle may be used to generate control signals that are effective to cause motors of the mobile paint tray vehicle to turn the front wheels left or right (depending on the direction of actuation of the toggle/joystick or other selectable control).

As shown and described below, the selectable controls may be positioned on the paint roller controller device (or other painting device, such as a paint brush) so that the controls may be operated simultaneously while holding the paint roller or other painting device in positions natural for painting. For example, the navigational control which controls steering may be positioned on a first side of the paint roller controller device at a position that is easily accessible to the user's thumb when the user is holding the paint roller controller device during painting. In some other examples, the accelerator control that controls forward and/or backward acceleration of the mobile paint tray vehicle may be instantiated as a trigger or other selectable control that is at a position that is easily accessible to the user's index finger or middle finger when the user is holding the paint roller controller device for painting.

In various examples, the paint roller controller device may include a battery and battery connection terminals that may be used to power the wireless transmitter (e.g., a 9 volt battery, one or more AA or AAA batteries, etc.). In some examples, the paint roller controller device may include an ON/OFF switch effective to power on or off the wireless transmitter. In some further examples, the paint roller controller device may include a control lock button effective to lock the controls such that selection of the selectable controls does not result in any control signal being transmitted to the mobile paint tray vehicle. Such a control lock button may be useful to prevent inadvertent/accidental actuation of the controls during painting, which may result in spillage or other accidents. In some examples, the paint roller controller device may include a physical guard (e.g., a trigger locking mechanism, a hinged button cover, etc.) for one or more of the selectable controls to prevent accidental actuation during painting.

The mobile paint tray vehicle may include a radio (including, for example, a wireless radio frequency receiver) that may receive control inputs from the controller device). The control inputs may be processed to control motors and/or solenoids of the mobile paint tray vehicle to turn an axel (or axels) to move the vehicle in a forward or reverse direction and/or to steer the mobile paint tray vehicle. The mobile paint tray vehicle may include one or more speed controllers effective to control operations of the motors (e.g., to control the speed and/or steering of the mobile paint tray vehicle). The control signal may be pulse-width modulated, for example, to control speed. In some examples, the maximum speed may be limited to avoid sloshing paint in the paint tray of the mobile paint tray vehicle during acceleration and/or in the event of a collision.

The wireless receiver of the mobile paint tray vehicle and the wireless transmitter of the painting device may use any desired wireless communication protocol. For example, the wireless transmitter and receiver may be a radio receiver/transmitter, a wireless network interfaces using the IEEE 802.11 Wi-Fi standard, a satellite communication interface (e.g., global positioning system (GPS) satellite control), cellular interfaces, etc. In cases where the mobile paint tray vehicle includes a wireless network interface, a mobile application executing on a smart phone or other computing device may authenticate with wireless network interface and may be used to control operation of the mobile paint tray vehicle. In various examples, voice commands may be used to send control instructions to the wireless network interface.

The mobile paint tray vehicle may include a battery effective to power the various motors and/or the radio. For example, the mobile paint tray vehicle may include a nickel-metal hydride (NiMH) or Lithium Polymer (LiPo) rechargeable battery. In some further examples, the mobile paint tray vehicle may include a speaker, amplifier, and/or Bluetooth receiver such that the mobile paint tray vehicle may be paired with a Bluetooth enabled device and used to play music or other audio.

FIG. 1 depicts a paint roller controller device 102 (e.g., a paint roller device, paint brush, and/or any other painting device used to apply paint) and mobile paint tray vehicle 104, in accordance with various aspects of the present disclosure. The paint roller controller device 102 may include a handle 106 that may be gripped by a user while painting and/or while operating and controlling the mobile paint tray vehicle 104. In some examples, the handle 106 may include a removable cap or port 108 that may be used to access an interior of the handle 106. The handle 106 may be at least partially hollow such that a cavity is formed in an interior of the handle 106 accessible by the removable cap or port 108. The cavity may include the various electronics of the paint roller controller device 102. For example, the cavity of the handle 106 may include the wireless transmitter, antenna, a power supply (e.g., one or more batteries), and/or one or more integrated circuit packages effective to detect electrical signals received from the selectable controls 110, 112. In some examples, the removable cap or port 108 may be used to replace the batteries. Although a paint roller controller device is generally referred to herein for illustrative purposes, the selectable controls 110, 112 and other electronics may be incorporated into any painting device. For example, instead of a roller-style device, the controller for the mobile paint tray vehicle 104 may be incorporated into a paint brush.

Additionally, in some examples, instead of the electronics and/or selectable controls 110, 112 being disposed within a painting device (such as a paint roller or paint brush), the electronics (including the wireless transmitter, power supply, etc.) and selectable controls 110, 112 may be instantiated in a device that is effective to be coupled to a painting device. For example, the wireless transmitter, power supply, selectable controls 110, 112, and/or any other electronics may be disposed in a casing that can be strapped to, fit around, or otherwise coupled to a painting device. For example, a rubber sleeve and/or external handle may be designed to fit over and grip a paint roller handle or the handle of a paint brush. The rubber sleeve, handle, casing, or other component may include the wireless transmitter, power supply, selectable controls 110, 112, and/or any other electronics described herein. In some other examples, the wireless transmitter, power supply, selectable controls 110, 112, and/or any other electronics may be in a casing that may be strapped to a painting device (e.g., using clips, straps, elastic bands, ties, hook and loop style fasteners, etc.). As used herein, a painting device may refer to a paint roller and/or paint brush with integrated selectable controls 110, 112, wireless transmitter, power supply, etc., or may refer to a component comprising the selectable controls 110, 112, wireless transmitter, power supply, etc. that can be coupled to a handle or other portion of a paint roller device or other paint application device (such as a brush).

In various examples, the selectable control 110 may be used to control a drive motor in the mobile paint tray vehicle 104 that may cause the motor to turn and drive the mobile paint tray vehicle 104 in a forward or reverse direction (depending upon the direction of activation of the selectable control 110). The selectable control 110 may be positioned on the handle 106 of the paint roller controller device 102 at a distal end of the handle 106 proximate to where support arm 114 of the paint roller is coupled to the handle 106. In this way, the selectable control 110 may be in a natural position for actuation by the user when the user is holding the paint roller controller device 102 in a position that is useful for painting a surface. The selectable control 112 may be positioned on the handle 106 of the paint roller controller device 102 at the same distal end of the handle 106 (e.g., proximate to where support arm 114 of the paint roller is coupled to the handle 106). However, selectable control 112 may be positioned on the opposite side of the handle 106 relative to the selectable control 110. Additionally, selectable control 112 may be positioned on an angled surface so that the user's thumb may comfortably rest on or near the selectable control 112 while holding the paint roller controller device 102 in a painting position with the user's index finger or middle finger on the selectable control 110. Selectable controls 110, 112 may be physical controls such as triggers, toggle switches, buttons, joysticks, directional pads, etc., or may be electronic controls such as a capacitive touch sensors, resistive touch sensors, optical touch sensors, infrared touch sensors, etc.

Selecting the selectable control 110 (e.g., for forward vehicle operation) causes a pair of electric contacts to touch which complete a circuit that is coupled to a specific pin of an integrated circuit. The integrated circuit may cause the transmitter to transmit a predefined sequence of electrical pulses (e.g., a group of synchronization pulses followed by the control command) at 27.9 MHz or 49 MHz (depending on the implementation). The sequence of electrical pulses is pulse modulated and includes the specific number of pulses for the encoded action (forward drive in this example).

The receiver circuit within the mobile paint tray vehicle monitors the relevant frequency (e.g., 27.9 MHz or 49 MHz) and filters the received signal to block out other frequencies (e.g., using a band pass filter). The receiver converts the received signal back into the sequence of electrical pulses. The pulse sequence is sent to an integrated circuit in the mobile paint tray vehicle 104 which decodes the sequence and controls the appropriate motor. For example, a particular number of pulses may cause the integrated circuit to operate the drive motor in a forward direction. In some examples, a second predefined number of pulses may instead cause the integrated circuit to operate the drive motor in a reverse direction.

In this example, the motor may cause the rear axel (e.g., the axel connected to wheel 124a) to spin (although the motor may instead cause the front axel to spin, according to the desired implementation). However, the drive shaft of the motor may be appropriately geared to decrease the speed of the motor and increase the torque. In various examples, this gearing may be used to limit the speed of the motor. This may be advantageous in order to avoid spilling or sloshing any paint that is currently being carried in the paint tray 120. In other examples, a pulse-width modulation controller of the mobile paint tray vehicle 104 may be effective to limit the voltage supplied to the drive motor to limit the torque applied to the relevant wheel 124a, 124b.

Similarly, the selectable control 112 may be used to control a servo motor in the mobile paint tray vehicle 104 that may cause the front wheels (e.g., wheel 124b and its counterpart) of the mobile paint tray vehicle 104 to pivot to steer the vehicle right or left (depending upon the direction of activation of the selectable control 112).

Positioning the selectable controls 110, 112 on the handle 106 as shown may be advantageous as the user may not need to reposition their grip from the natural painting grip in order to operate the mobile paint tray vehicle 104.

Paint roller controller device 102 may further include a support arm 114 that may support a rotating core 118. A paint roller cover 116 may fit over the rotating core 118. The paint roller cover 116 may soak up paint from the paint tray 120 and may then be rolled along the surface being painted to apply the paint to the surface.

Mobile paint tray vehicle 104 may be of different appearances depending on the desired implementation. In the example, shown in FIG. 1, the body 122 of the mobile paint tray vehicle 104 is shaped to resemble a commercial cargo van. However, any desired shape may be used. For example, instead of resembling a commercial vehicle as in the example depicted in FIG. 1, the mobile paint tray vehicle 104 may instead merely be a chassis that is effective to secure a paint tray 120 while the mobile paint tray vehicle 104 is in motion.

In various examples, the top portion of the body of the mobile paint tray vehicle 104 may be formed so as to include a recessed portion that is configured to fit and/or support an edge of a standard size paint roller tray or other paint receptacle (such as paint tray 120). For example, a top portion of the body of the mobile paint tray vehicle 104 may be sized and shaped (e.g., molded) so that a body of a paint roller tray (e.g. paint tray 120) fits within a recess formed by the top portion of the body of the mobile paint tray vehicle 104 or such that the top of the vehicle includes a recessed portion that resembles and functions as a standard paint roller tray. Paint trays and/or plastic inserts for paint trays may be of different standard sizes depending on the manufacturer (e.g., 9.25"×15.5", 10.5"×15", 10.5"×14.25", 10.5"× 14.5", 11"×16.5", 11.8"×16.8", etc.). Although the paint tray 120 is shown as a roller paint tray typically used to hold paint and allow application of the paint held by the tray to a paint roller, the paint tray 120 may instead be another type of paint receptacle. For example, the paint tray 120 may be a bucket or other container that can hold paint and allow some painting device to be dipped into the paint held by the paint tray 120. For example, the mobile paint tray vehicle 104 may be a chassis that is configured to securely hold a paint bucket. In this example, the paint bucket may be the paint tray 120. In other examples, such as the one depicted in FIG. 1, the mobile paint tray vehicle 104 may hold a paint tray 120 that resembles a paint roller tray (as shown in FIG. 1). In general, the shape and appearance of the mobile paint tray vehicle 104 and the paint tray 120 depends upon the desired implementation and may vary accordingly.

In various examples, the top portion of the body of the mobile paint tray vehicle 104 may be sized and shaped so as to be large enough to accommodate any of the above-mentioned sizes of paint trays/paint tray inserts. In some examples, the size of the recess of a molded top of the mobile paint tray vehicle 104 (e.g., the recess that accommodates the paint tray and/or that is formed into the shape of a paint tray) may be adjustable such that a variety of different sizes of paint trays and/or plastic paint tray inserts may be held by the recess. For example, an elastic band or a sliding bulkhead (e.g., using slots and/or pegs to adjust the size of the sliding bulkhead) may be used to hold an inserted paint tray securely within the recessed portion.

In various examples, instead of including a recessed portion formed so as to either be a paint tray 120 or to incorporate a removable paint tray 120 (e.g., a paint tray liner or rigid paint tray) the mobile paint tray vehicle 104 may have other means for holding the paint tray 120. For example, the mobile paint tray vehicle 104 may include clips, clamps, elastic bands, a molded recess configured to hold the paint tray 120 (or configured to be the paint tray 120), molded protrusions (e.g., posts, ridges, etc.), etc., effective to secure a paint tray 120 to the top of the mobile paint tray vehicle 104. Any such features used to secure the paint tray 120 on the mobile paint tray vehicle 104 or to form the paint tray 120 as part of the mobile paint tray vehicle 104 may be referred to herein as "features", for brevity. As used herein, securing paint tray 120 refers to holding paint tray 120 in a relatively fixed position while the mobile paint tray vehicle 104 is moved such that the paint tray 120 does not fall off the mobile paint tray vehicle 104 and such that paint within the paint tray 120 may be held within the paint tray 120 during motion.

In another example, the top of mobile paint tray vehicle 104 may include a basket, cage, and/or other raised support structure for holding the paint tray 120 and securing it to the top of the mobile paint tray vehicle 104 (e.g., using gravity and structure to prevent the paint tray 120 from falling off of the mobile paint tray vehicle 104 while the vehicle is in motion). In another example, the paint tray 120 may have pegs on a lower portion of the paint tray 120 that may fit into corresponding holes in a top surface of the mobile paint tray vehicle 104 to hold the paint tray 120 on the mobile paint tray vehicle 104 while the mobile paint tray vehicle 104 is in motion (or while the mobile paint tray vehicle 104 is stationary). In yet another example, the paint tray 120 may magnetically couple to the mobile paint tray vehicle 104 via ferromagnetic material (e.g., permanent or impermanent magnets) either in the mobile paint tray vehicle 104, the paint tray 120, or in both.

In various examples, the paint roller tray (e.g., paint tray 120) may be removable and supported by the lip 126, as described below. In some examples, the recess may be a cavity such that when the paint roller tray is placed within the cavity the paint roller tray is only supported by the lip 126 (e.g., an flange or rim supporting the paint roller tray around a perimeter of the paint roller tray). However, in some other examples, there may be internal support structures to support the paint roller tray from underneath. In still other examples, the top of the mobile paint tray vehicle 104 may be molded in the shape of a paint roller tray such that a paint roller tray placed within the molded recess is relatively uniformly supported by the molded recess in the top portion of the mobile paint tray vehicle 104. In cases where the top of the mobile paint tray vehicle 104 is molded in the shape of a paint roller tray, paint roller tray inserts (e.g., thin plastic inserts commonly available for painting) may be placed within the recessed portion to hold the paint and avoid pouring the paint directly on to the top of the mobile paint tray vehicle 104. Additionally, in cases where the top of the mobile paint tray vehicle 104 is molded in the shape of a paint roller tray, there may be one or more ridges in the top of the molding to prevent a plastic insert from sticking to the top of the vehicle and/or to aid in removal. In some additional cases, there may be one or more holes or perforations in the recessed portion of the top of the mobile paint tray vehicle so that a user can access a compartment of the mobile paint tray vehicle 104 and may push upward from below to remove a stuck paint roller insert. In some further cases, there may be tags, ribbons, or levers that may extend over lip 126 to aid in removal of plastic inserts.

Additionally, the mobile paint tray vehicle 104 may include one or more rear doors (not visible in FIG. 1) or other doors or covers that cover a storage compartment. In some examples, the storage compartment may be accessed in order to provide access to an underside of the paint tray 120 and to assist in removing the paint tray 120 (e.g., by accessing the underside of the paint tray 120 via the storage compartment and applying an upward force). In other examples, the top of the storage compartment may be molded such that the paint tray 120 is not exposed to an interior of the storage compartment. The storage compartment may store various tools such as paint brushes, paint, caulk, drywall spackle, drywall "mud", and/or the paint roller controller device 102. In some examples, one or more ribbons or levers may be fixed underneath the paint tray 120 and exposed over the lip 126. Upward force may be applied to such ribbons or levers to assist in removing the paint tray 120 from the recessed portion of the body of mobile paint tray vehicle 104. This may be especially useful when dried paint has fused the paint tray 120 to the lip or to other portions of the body of the mobile paint tray vehicle 104. In various examples, the storage compartment may be vertically subdivided by a molded plastic plane that is substantially horizontal. The subdivider may be affixed to the side walls of the mobile paint tray vehicle and/or may slide into a notch along the side walls (such that the subdivider may be removed as desired). The paint roller controller device 120 may be stored either above or below this subdivider while other items (e.g., paint brushes, etc.) may be stored on the opposite side of the subdivider.

The paint tray 120 may include a rim around an exterior edge of the top portion of the paint tray 120 that may rest upon a lip 126 of the mobile paint tray vehicle 104 such that the paint tray 120 rests within a top portion of the mobile paint tray vehicle 104, as shown. Nesting the paint tray inside of the mobile paint tray vehicle 104 (by including the recessed compartment and the lip 126) may lower the center of gravity of the mobile paint tray vehicle, which may, in turn help to prevent spillage and/or sloshing of the paint. In various examples, the body 122 of the mobile paint tray vehicle 104 may include a compartment in which the paint roller controller device 102 (and/or other supplies) may be stored when not in use. In various examples, the mobile paint tray vehicle 104 may include a speaker, amplifier, and Bluetooth receiver such that the mobile paint tray vehicle 104 may pair with another Bluetooth enabled device to output audio (e.g., music). In some examples, the mobile paint tray vehicle 104 may include a hydraulic suspension and/or a pneumatic suspension in order to cushion impacts and/or to render the mobile paint tray vehicle 104 less prone to spilling paint during acceleration/deceleration.

In various further examples, the mobile paint tray vehicle 104 may include one or more cameras and a microprocessor effective to monitor the physical environment using computer vision techniques such as object detection and/or three dimensional room modeling. In various examples, the mobile paint tray vehicle 104 may use a received signal strength indicator (RSSI) signal to maintain a minimum distance to the paint roller controller device 102. For example, the mobile paint tray vehicle 104 may use the RSSI signal as well as various object avoidance systems (e.g., computer vision and/or proximity sensors) to attempt to stay proximate to the paint roller controller device 102 while powered on. For example, in some operational modes, if the RSSI value falls below a threshold RSSI value, the microcontroller of the mobile paint tray vehicle 104 may be effective to operate the motors of the mobile paint tray vehicle 104 to move the mobile paint tray vehicle 104 toward the paint roller controller device 102 until the RSSI value is within a predefined range.

In many cases, a painter moves along a wall or other surface as they paint that wall or surface. In some examples, the mobile paint tray vehicle 104 may have sensors (e.g., Lidar, radar) and/or may use one or more cameras and computer vision object/surface detection algorithms executed by a processor of the mobile paint tray vehicle 104 to detect the nearest wall/surface. When the drive motor of the mobile paint tray vehicle 104 is engaged (e.g., after actuating selectable control 110), the processor of the mobile paint tray vehicle 104 may use processor-implemented control logic (e.g., autonomous control) to steer the mobile paint tray vehicle 104 to avoid colliding with the detected wall while moving along the wall (e.g., toward the user and/or toward the paint roller controller device 102). For example, the mobile paint tray vehicle 104 may be automatically controlled to drive toward the direction of increased RSSI values, thereby navigating the mobile paint tray vehicle 104 toward the paint roller controller device 102 while avoiding obstacles and/or walls. Accordingly, when selectable control 110 (e.g., a trigger) is depressed or otherwise selected, the vehicle may drive along the wall or other surface without colliding with the surface. This may avoid the user having to steer the vehicle along the wall in order to have the mobile paint tray vehicle 104 move along the wall. This may be convenient as the painter may be distracted while painting the wall and may want to move the paint tray nearer without looking at the mobile paint tray vehicle 104 or without worrying about manually steering the mobile paint tray vehicle 104 using the selectable control 112.

In some examples, a control mode of the mobile paint tray vehicle 104 may be selectively enabled/disabled that causes the mobile paint tray vehicle 104 to detect and/or follow along the nearest surface as described above. The control mode may be enabled/disabled via another selectable control on the mobile paint tray vehicle 104 or the paint roller controller device 102 (not shown) or through a companion mobile application associated with the painting system.

In various other examples, the paint roller controller device 102 may include an accelerometer and processor-implemented logic to detect whether the paint roller controller device 102 is currently in the act of painting. For example, the accelerometer may send acceleration data to the processor of the mobile paint tray vehicle 104. The processor may detect acceleration above a threshold value and/or acceleration variance above a threshold variance within a certain amount of time, and may detect a painting state of the paint roller controller device 102. In another example, the frequency of change in the direction of acceleration (as would be common while painting with a paint roller) may be used to detect a painting state. In various examples, the operation of selectable controls 110, 112 may be disabled (e.g., inhibited) while the paint roller controller device 102 is determined to be in a painting state in order to avoid inadvertent operation of the mobile paint tray vehicle 104. In another example, the processor may inhibit the motor function while a painting state is detected (e.g., based on the accelerometer data). In some other examples, the paint roller controller device 102 may include a switch (or other selectable control) to disable/enable the selectable control 110 and/or the selectable control 112. Accordingly, a user may disable the selectable controls 110, 112 while painting and may enable the selectable controls 110, 112 when the user desires to operate the mobile paint tray vehicle 104 (e.g., to move the paint tray 120 to a desired location).

Figure 2A:
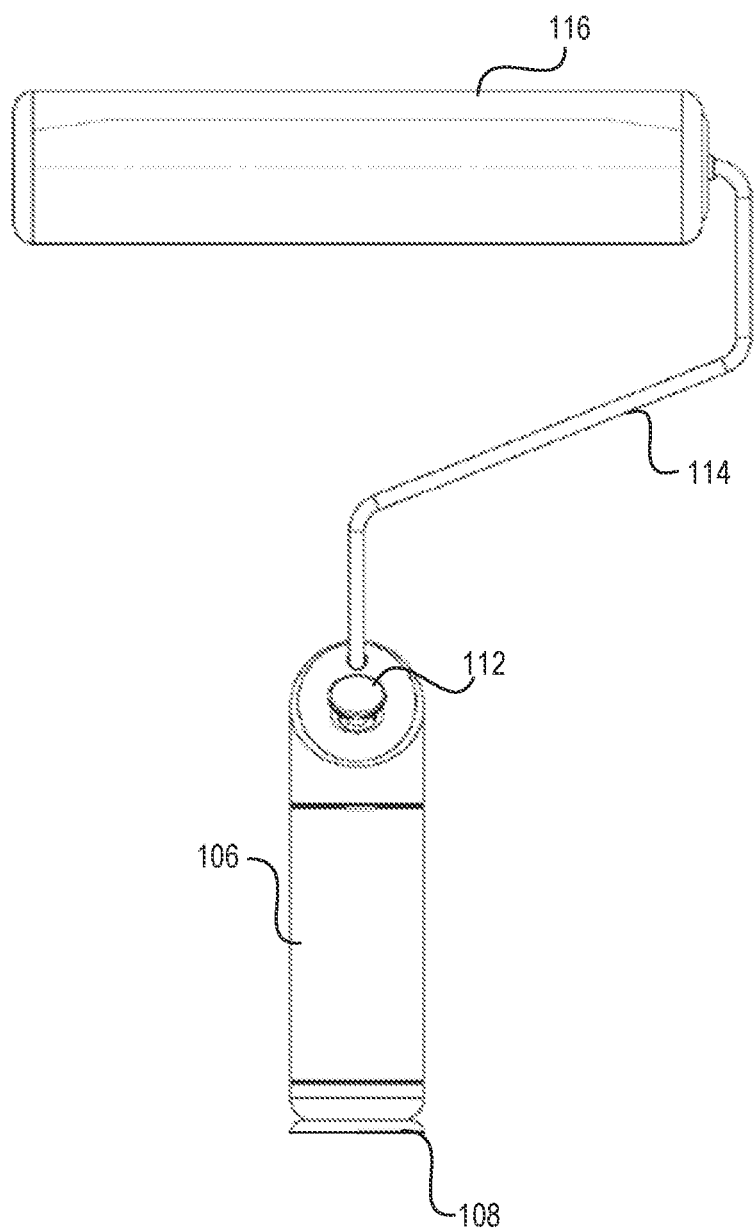
FIG. 2A depicts a front view of the paint roller of FIG. 1, in accordance with various aspects of the present disclosure.

FIG. 2A depicts a front view of the paint roller of FIG. 1, in accordance with various aspects of the present disclosure. Those aspects of FIG. 2A that have been previously described above in reference to FIG. 1 may not be described again, for brevity.

Figure 2B:
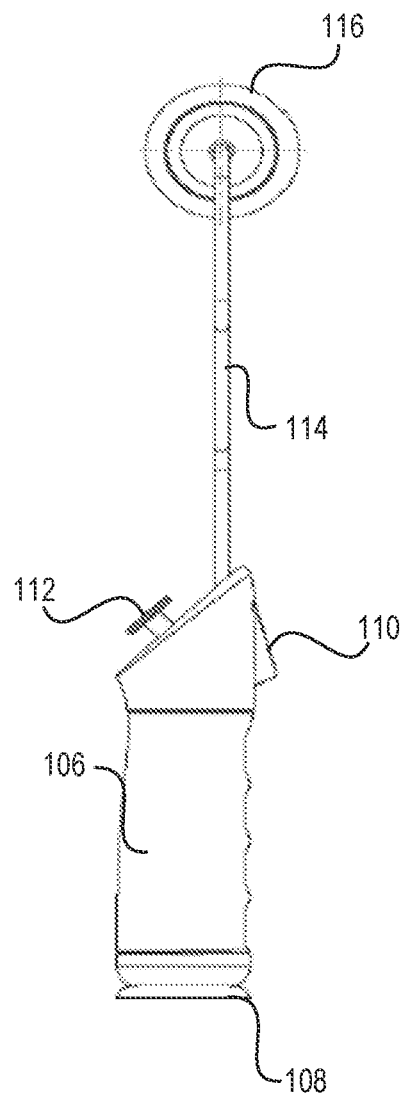
FIG. 2B depicts a side view of the paint roller of FIG. 2A, in accordance with various aspects of the present disclosure.

FIG. 2B depicts a side view of the paint roller of FIG. 2A, in accordance with various aspects of the present disclosure. Those aspects of FIG. 2B that have been previously described above in reference to FIGS. 1-2A may not be described again, for brevity.

Figure 2C:
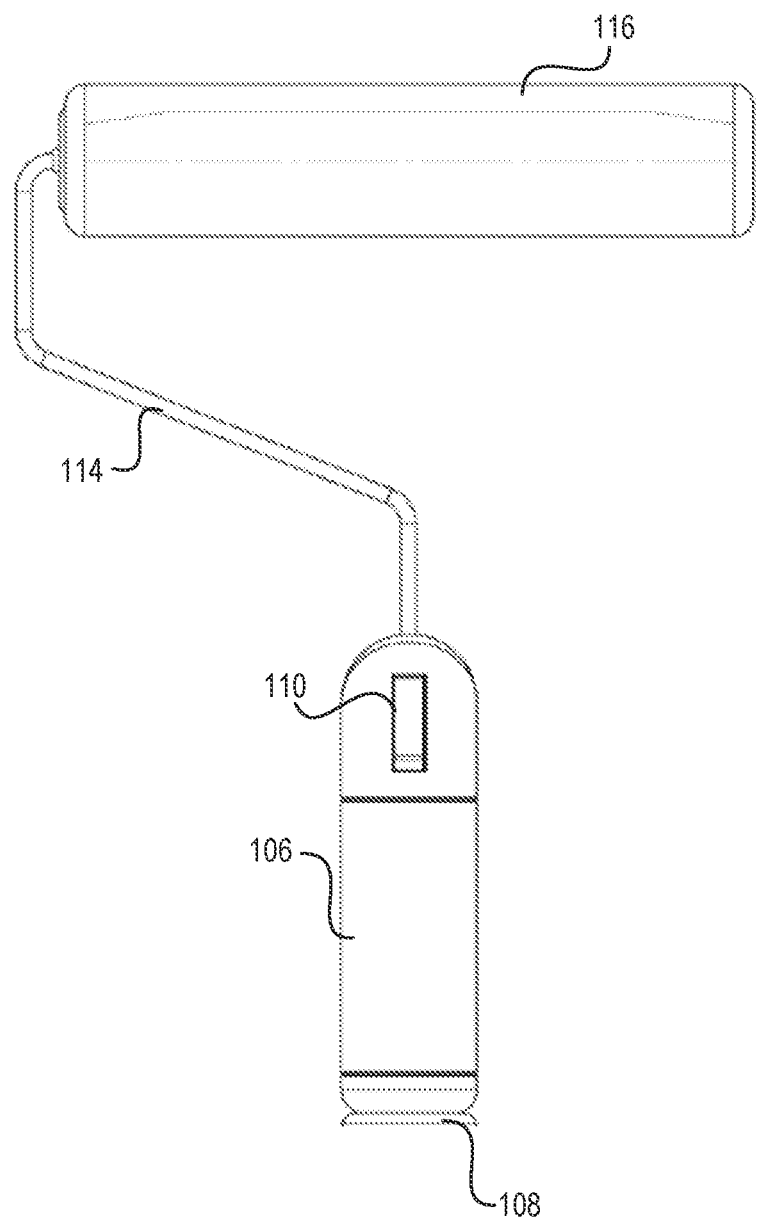
FIG. 2C depicts a back view of the paint roller of FIG. 2A, in accordance with various aspects of the present disclosure.

FIG. 2C depicts a back view of the paint roller of FIG. 2A, in accordance with various aspects of the present disclosure. Those aspects of FIG. 2C that have been previously described above in reference to FIGS. 1-2B may not be described again, for brevity.

Figure 2D:
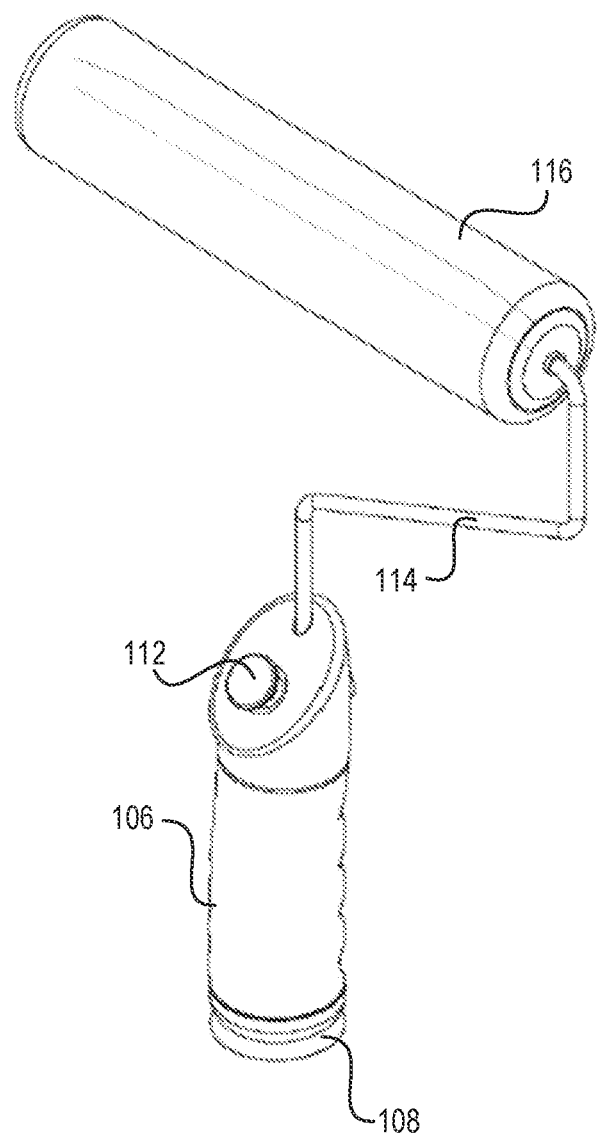
FIG. 2D depicts a perspective front view of the paint roller of FIG. 2A, in accordance with various aspects of the present disclosure.

FIG. 2D depicts a perspective front view of the paint roller of FIG. 2A, in accordance with various aspects of the present disclosure. Those aspects of FIG. 2D that have been previously described above in reference to FIGS. 1-2C may not be described again, for brevity.

Figure 2E:
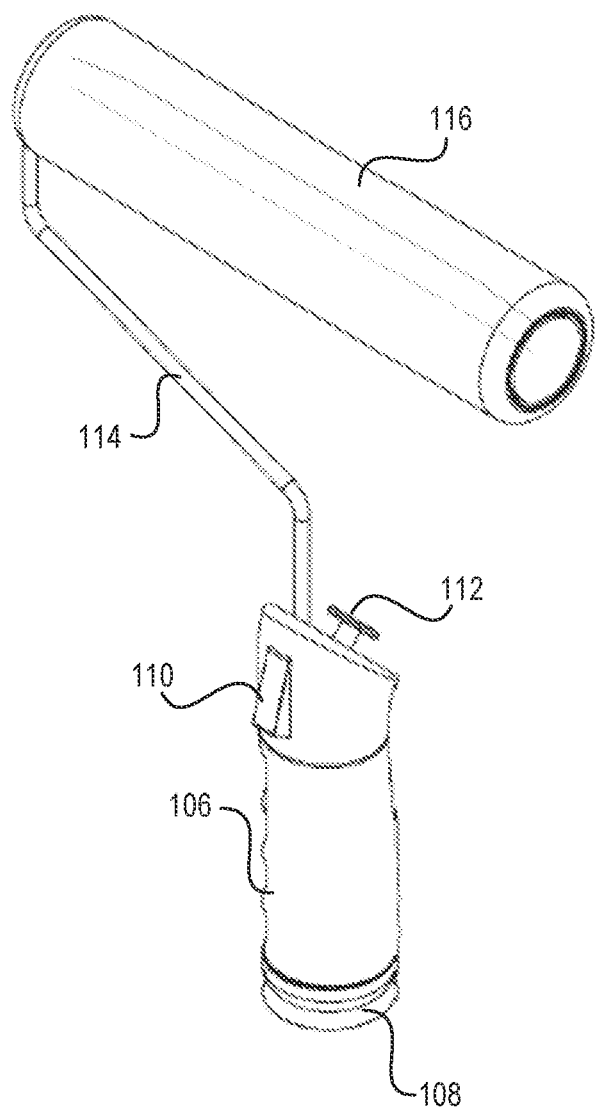
FIG. 2E depicts a perspective back view of the paint roller of FIG. 2A, in accordance with various aspects of the present disclosure.

FIG. 2E depicts a perspective back view of the paint roller of FIG. 2A, in accordance with various aspects of the present disclosure. Those aspects of FIG. 2E that have been previously described above in reference to FIGS. 1-2D may not be described again, for brevity.

Figure 3A:
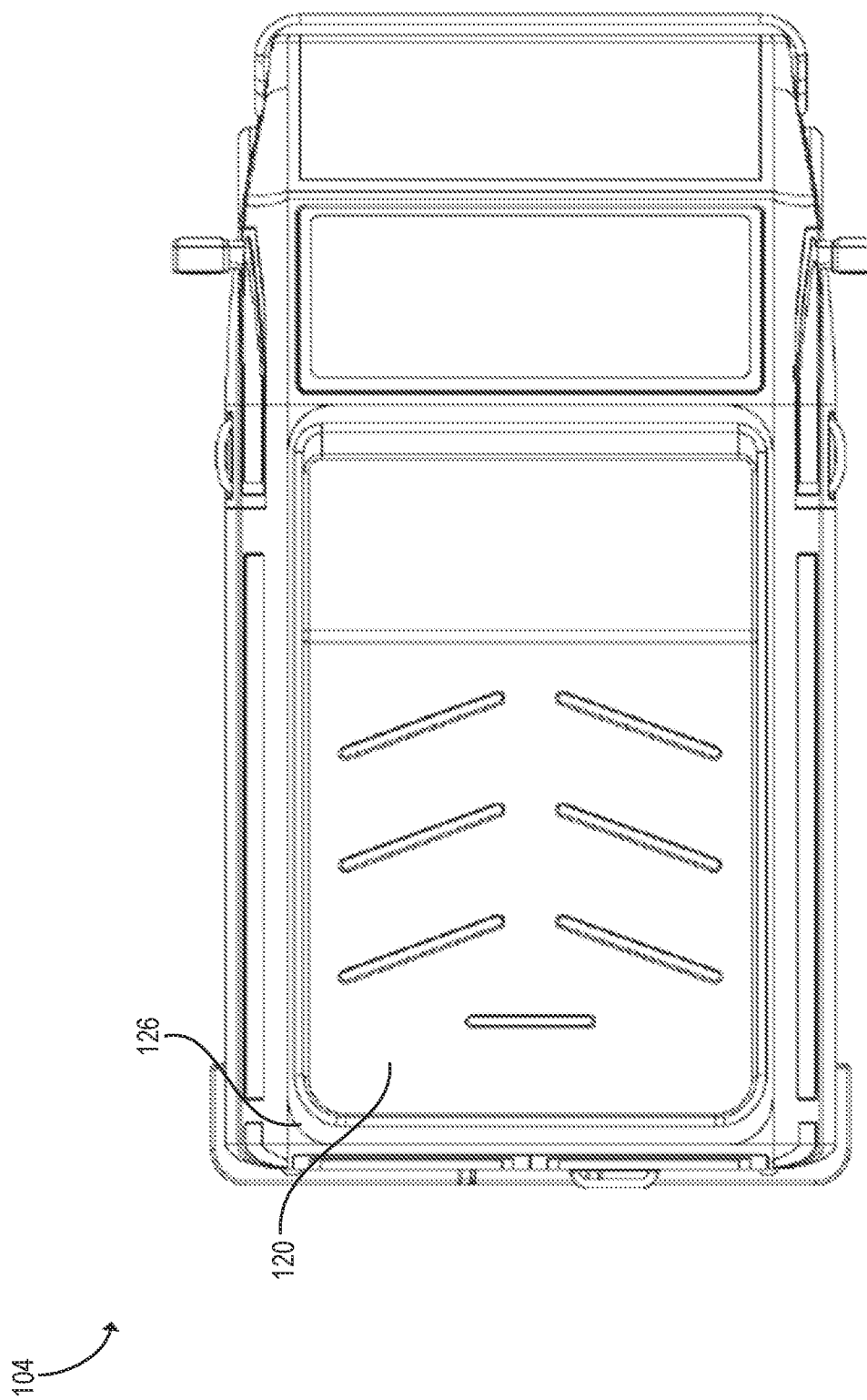
FIG. 3A depicts a top view of the mobile paint tray vehicle of FIG. 1, in accordance with various aspects of the present disclosure.

FIG. 3A depicts a top view of the mobile paint tray vehicle of FIG. 1, in accordance with various aspects of the present disclosure. Those aspects of FIG. 3A that have been previously described above in reference to FIG. 1 may not be described again, for brevity.

Figure 3B:
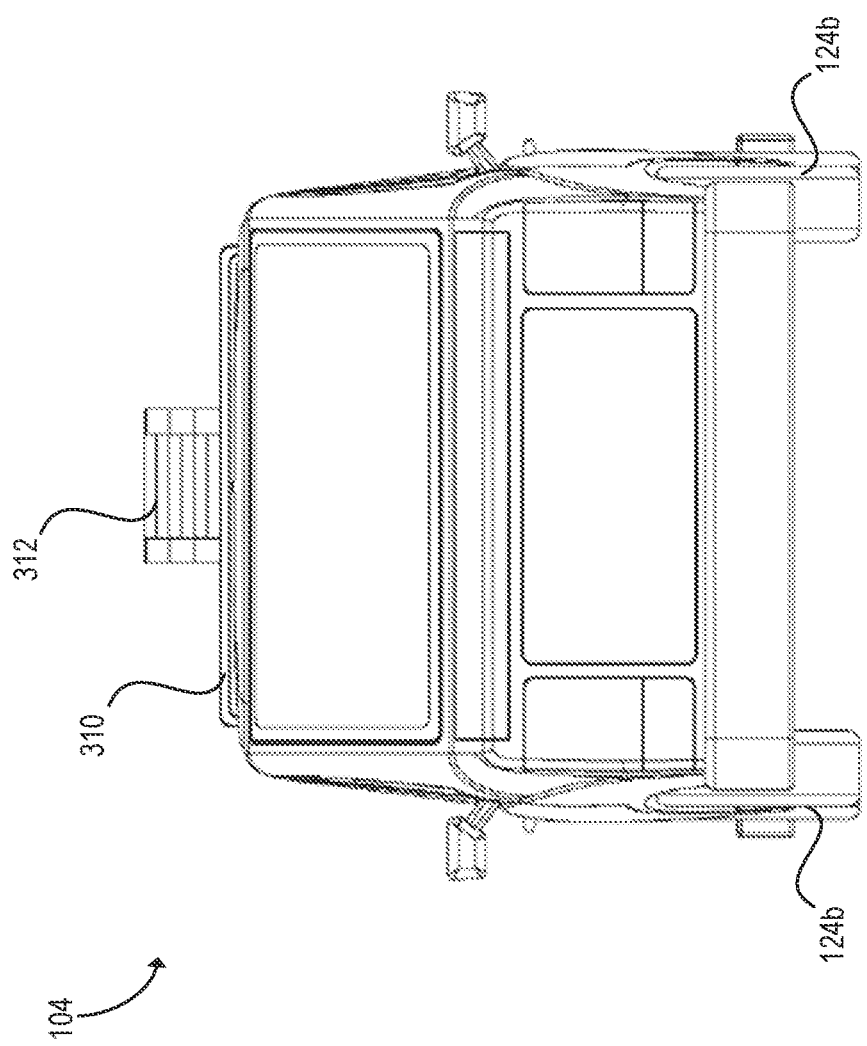
FIG. 3B depicts a front view of the mobile paint tray vehicle of FIG. 1 with a lid covering the recessed paint tray, in accordance with various aspects of the present disclosure.

FIG. 3B depicts a front view of the mobile paint tray vehicle of FIG. 1 with a lid covering the recessed paint tray, in accordance with various aspects of the present disclosure. Those aspects of FIG. 3B that have been previously described above in reference to FIGS. 1-3A may not be described again, for brevity. Additionally, FIG. 3B depicts a lid 310 covering the recessed paint tray 120 of the mobile paint tray vehicle 104. In the example depicted in FIG. 3B, the lid 310 is formed so as to resemble the roof of a cargo van. Additionally, in the example depicted in FIG. 3B, the lid 310 includes a handle 312 that may be grasped in order to remove or replace the lid. In the example depicted in FIG. 3B, the handle 312 may resemble one or more ladders stacked on top of the cargo van. However, any type handle may be used in accordance with the desired implementation. Functionally, the lid 310 may keep paint in the paint tray 120 from drying out (e.g., while the painter takes a break, attends to another task, and/or during prolonged periods of painting).

Figure 3C:
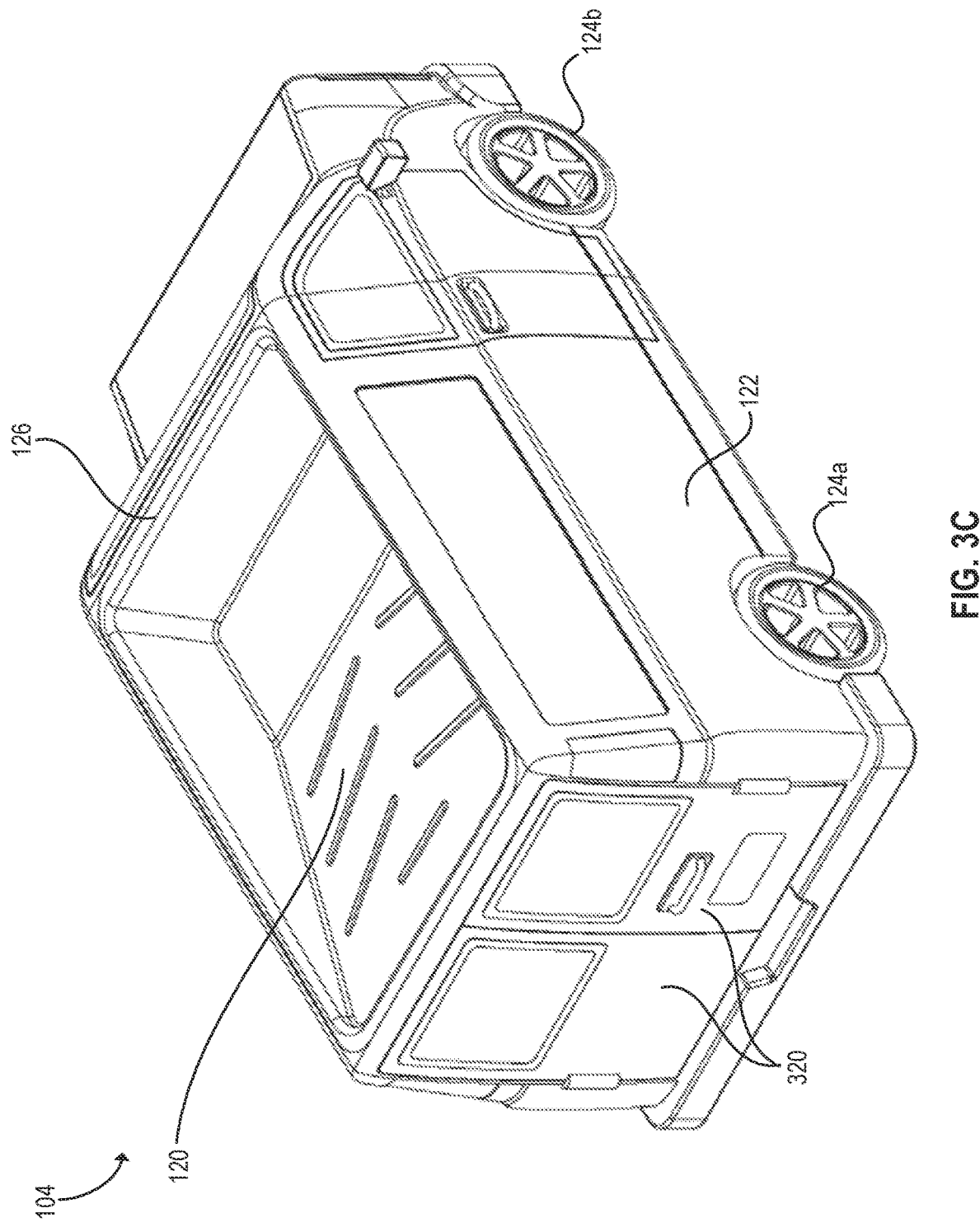
FIG. 3C depicts a perspective back view of the mobile paint tray vehicle of FIG. 3B with the lid removed, in accordance with various aspects of the present disclosure.

FIG. 3C depicts a perspective back view of the mobile paint tray vehicle of FIG. 3B with the lid removed, in accordance with various aspects of the present disclosure. Those aspects of FIG. 3C that have been previously described above in reference to FIGS. 1-3B may not be described again, for brevity. Additionally, the mobile paint tray vehicle 104 may include one or more rear doors 320 that may cover a storage compartment. In some examples, the storage compartment may be accessed in order to remove the paint tray 120 (e.g., by accessing the bottom of the paint tray 120 via the storage compartment and applying an upward force). In other examples, the top of the storage compartment may be molded such that the paint tray 120 is not exposed to an interior of the storage compartment. Additionally, the storage compartment may be used to store the paint roller controller device 102, paint brushes, and/or other items, as desired.

Figure 3D:
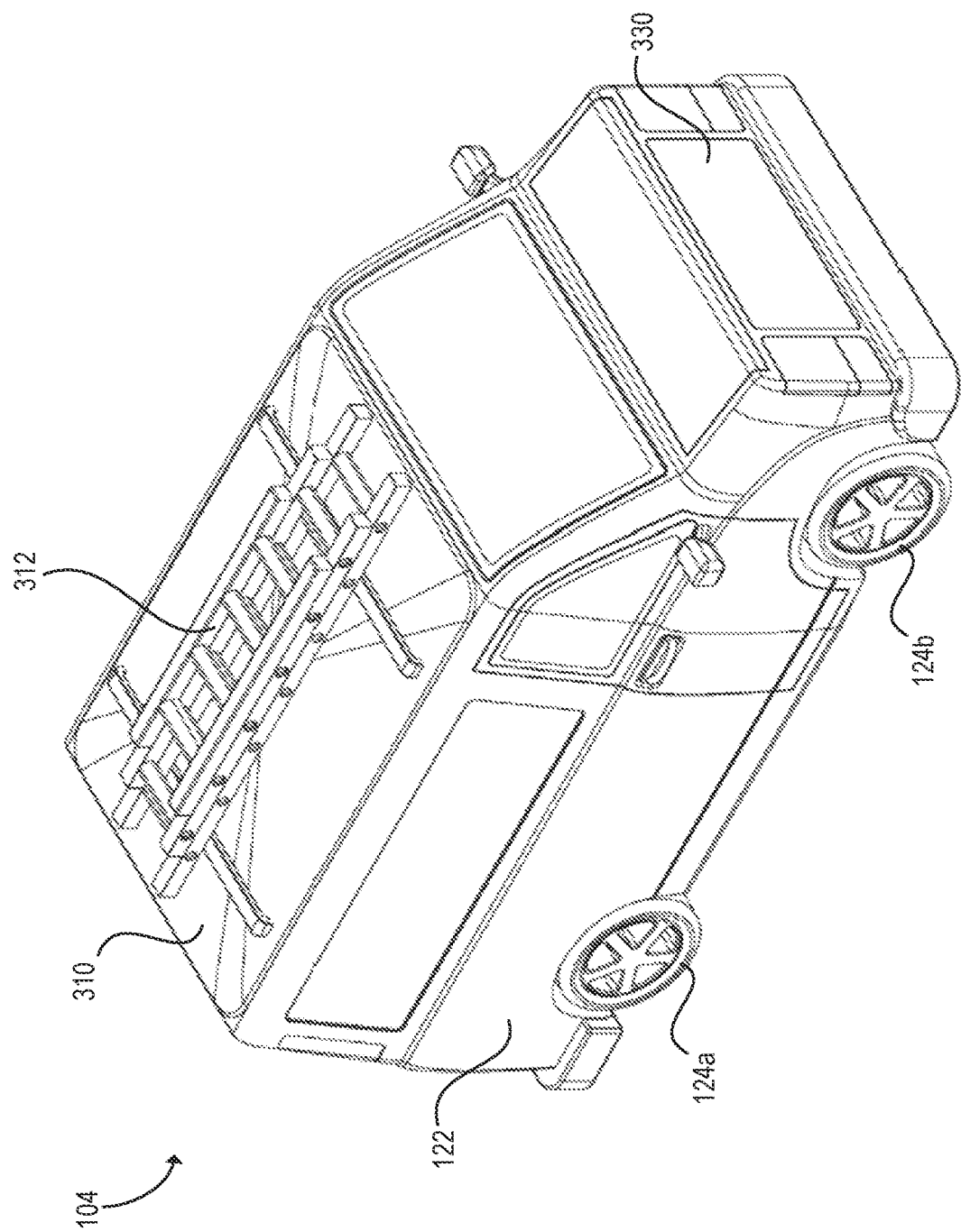
FIG. 3D depicts a perspective front view of the mobile paint tray vehicle of FIG. 3C, with the lid covering the recessed paint tray, in accordance with various aspects of the present disclosure.

FIG. 3D depicts a perspective front view of the mobile paint tray vehicle of FIG. 3C, with the lid covering the recessed paint tray, in accordance with various aspects of the present disclosure. Those aspects of FIG. 3D that have been previously described above in reference to FIGS. 1-3C may not be described again, for brevity. In the example mobile paint tray vehicle 104 depicted in FIG. 3D, a speaker grill 330 may be included. The speaker grill may be made of a perforated and/or breathable material and may cover an audio speaker within the housing of the mobile paint tray vehicle 104. The speaker grill may protect the speaker from damage while allowing sound to be transmitted from the speaker to the environment of the mobile paint tray vehicle 104. As previously described, the mobile paint tray vehicle 104 may include a Bluetooth enabled speaker such that an external audio source may pair with the speaker to play music, phone calls, or other audio.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A painting system, comprising:
    a vehicle comprising:
        a wireless receiver;
        a first motor configured in communication with the wireless receiver, wherein the first motor is configured to drive at least one wheel of the vehicle;
        a first power supply configured to supply power to the first motor; and
        a body comprising at least one feature effective to secure a paint tray to the vehicle;
    a paint roller controller device comprising:
        a removable cap covering a port on a first end of the paint roller controller device;
        a wireless transmitter disposed within the port;
        a first selectable control disposed proximate to a second end of the paint roller controller device on a handle of the paint roller controller device, wherein the second end of the paint roller controller device is opposite the first end, the first selectable control effective to generate a first control signal in response to selection of the first selectable control, wherein the first control signal is effective to control operation of the first motor;
        a support arm coupled to the handle of the paint roller controller device at the second end of the paint roller controller device, the support arm supporting a rotating core;
        a second selectable control disposed on a first surface at the second end of the paint roller controller device adjacent the support arm, wherein a position of the second selectable control opposes a position of the first selectable control; and
        a second power supply disposed within the port.

2. The painting system of claim 1, wherein the second selectable control is effective to generate a second control signal in response to selection of the second selectable control.

3. The painting system of claim 2, wherein the vehicle further comprises:
a second motor configured in communication with the wireless receiver, wherein the second motor is configured to pivot at least one wheel of the vehicle.

4. The painting system of claim 3, wherein the second control signal is effective to control operation of the second motor.

5. The painting system of claim 1, wherein the at least one feature comprises a recessed portion of the body, wherein the body further comprises a compartment providing access to an underside of the paint tray when the paint tray is installed in the recessed portion.

6. The painting system of claim 1, wherein the at least one feature comprises a recessed portion of the body, the body further comprising a lip sized and shaped to support an edge of the paint tray when the paint tray is installed in the recessed portion.

7. The painting system of claim 1, wherein the body comprises a compartment accessible by a door, wherein the compartment is sized and shaped to store the paint roller controller device with the door in a closed position.

8. The painting system of claim 1, wherein the paint roller controller device further comprises an accelerometer effective to transmit acceleration data to the vehicle.

9. The painting system of claim 8, the vehicle further comprising a processor effective to:
receive the acceleration data from the paint roller controller device;
determine, based on the acceleration data, that the paint roller controller device is being used for painting; and
inhibit function of the first motor based on the acceleration data.

10. The painting system of claim 1, the vehicle further comprising a processor effective to:
determine a received signal strength indicator (RSSI) value for at least one wireless communication received from the paint roller controller device;
determine that the RSSI value is less than a threshold value; and
control the first motor to drive at least one wheel of the vehicle in response to the RSSI value being less than the threshold value.

11. The painting system of claim 1, the paint roller controller device further comprising a guard effective to prevent actuation of the first selectable control.

12. A vehicle comprising:
a wireless receiver;
a first motor configured in communication with the wireless receiver, wherein the first motor is configured to drive at least one wheel of the vehicle;
a first power supply configured to supply power to the first motor; and
a body comprising at least one feature effective to secure a paint tray to the vehicle; and
wherein the wireless receiver is effective to receive a first control signal from a controller device integrated in a paint roller controller device to control operation of the first motor, wherein the paint roller controller device comprises:
a removable cap covering a port on a first end of the paint roller controller device;
a wireless transmitter disposed within the port;
a first selectable control disposed proximate to a second end of the paint roller controller device on a handle of the paint roller controller device, wherein the second end of the paint roller controller device is opposite the first end, the first selectable control effective to generate a first control signal in response to selection of the first selectable control, wherein the first control signal is effective to control operation of the first motor;
a support arm coupled to the handle of the paint roller controller device at the second end of the paint roller controller device, the support arm supporting a rotating core; and
a second power supply disposed within the port.

13. The vehicle of claim 12, wherein the at least one feature comprises a recessed portion of the body, wherein the body further comprises a compartment providing access to an underside of the paint tray when the paint tray is installed in the recessed portion.

14. The vehicle of claim 12, wherein the at least one feature comprises a recessed portion of the body, the body further comprising a lip sized and shaped to support an edge of the paint tray when the paint tray is installed in the recessed portion.

15. The vehicle of claim 12, wherein the body comprises a compartment accessible by a door, wherein the compartment is sized and shaped to store the controller device with the door in a closed position.

16. A method comprising:
receiving a first selection of a first selectable control of a paint roller controller device;
generating, in response to selection of the first selectable control, a first control signal;
transmitting the first control signal using a wireless transmitter;
receiving, by a wireless receiver of a vehicle, the first control signal; and
controlling operation of a first motor of the vehicle in response to the first control signal;
wherein a body of the vehicle comprises at least one feature effective to secure a paint tray to the vehicle;
wherein the paint roller controller device comprises:
a removable cap covering a port on a first end of the paint roller controller device;
a wireless transmitter disposed within the port;
the first selectable control disposed proximate to a second end of the paint roller controller device on a handle of the paint roller controller device, wherein the second end of the paint roller controller device is opposite the first end, the first selectable control effective to generate a first control signal in response to selection of the first selectable control, wherein the first control signal is effective to control operation of the first motor;
a support arm coupled to the handle of the paint roller controller device at the second end of the paint roller controller device, the support arm supporting a rotating core; and
a second power supply disposed within the port.

17. The method of claim 16, further comprising:
determining, by at least one processor of the vehicle, a first received signal strength indicator (RSSI) value of the first control signal;
determining, by the at least one processor, that the first RSSI value is lower than a previously-determined RSSI value; and
controlling operation of the first motor to move the vehicle in a direction to increase the received signal strength of signals transmitted by the paint roller controller device.

18. The method of claim 16, wherein the at least one feature comprises a recessed portion of the body, wherein the body further comprises a lip sized and shaped to support an edge of the paint tray when the paint tray is installed in the recessed portion.

\* \* \* \* \*